Figure 1:
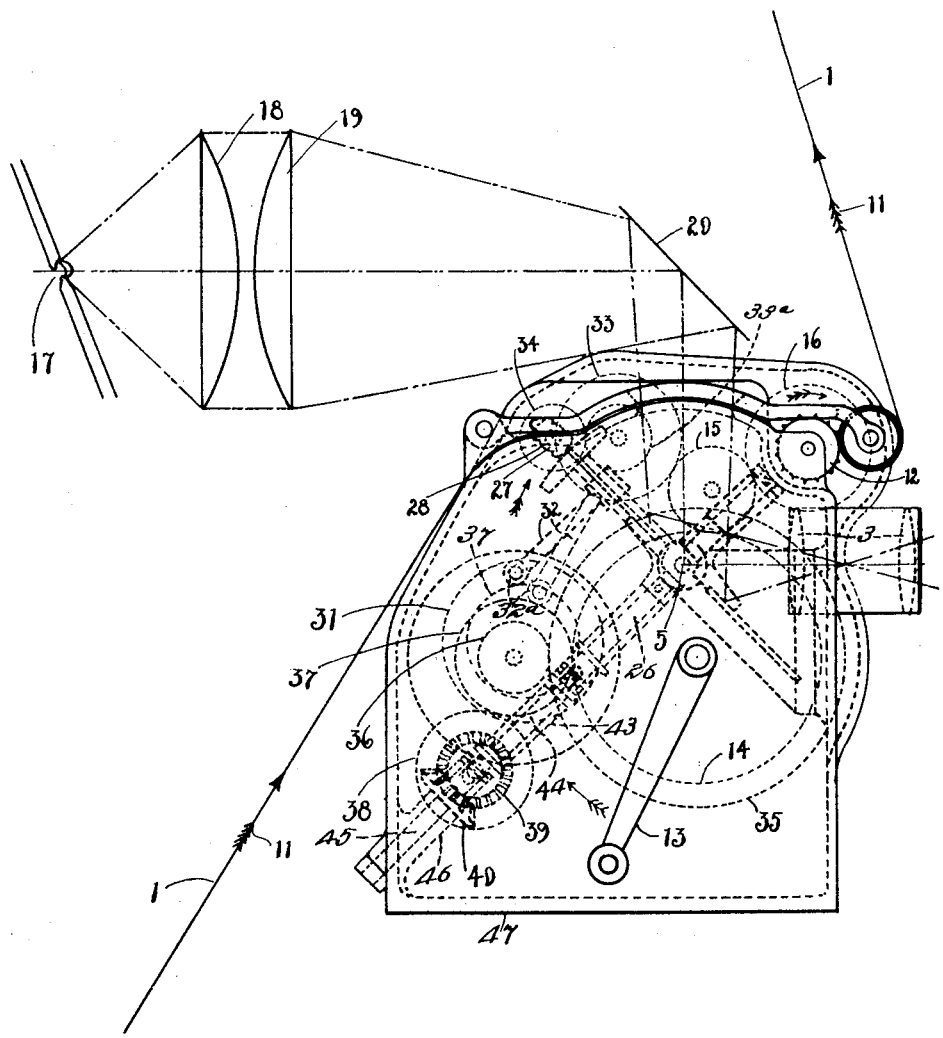

L. C. VAN RIPER.
MOTION PICTURE MACHINE.
APPLICATION FILED JULY 19, 1911.

1,085,392.

Patented Jan. 27, 1914.
3 SHEETS—SHEET 1.

WITNESSES:

INVENTOR
Lewis C. Van Riper

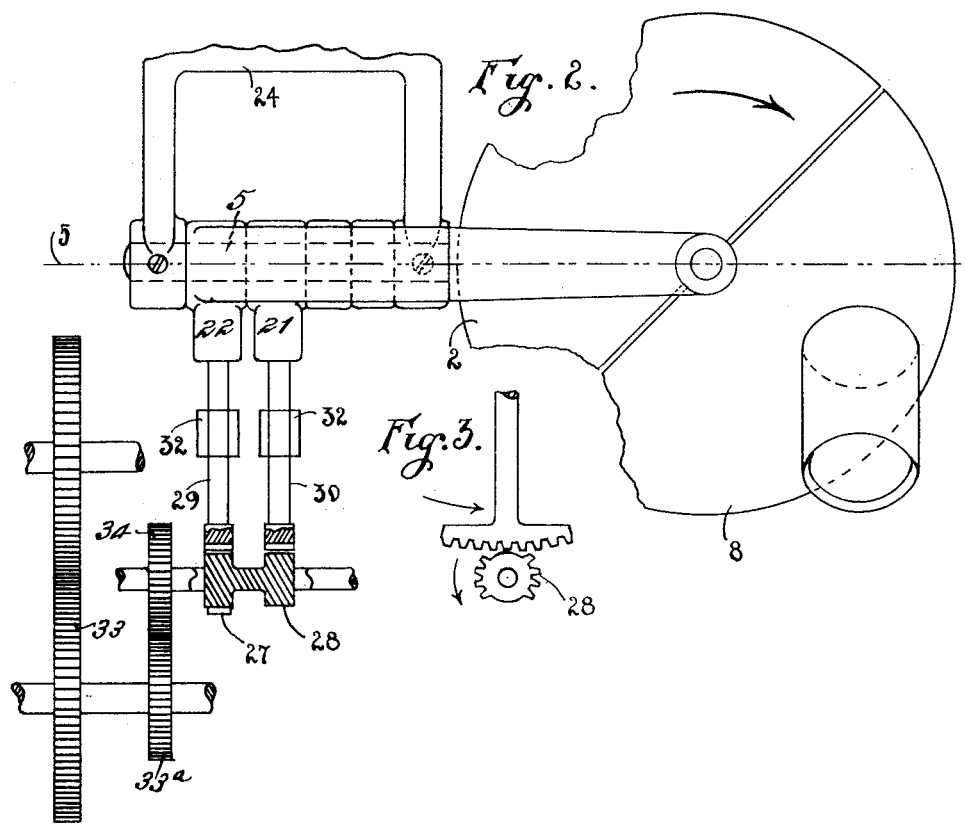

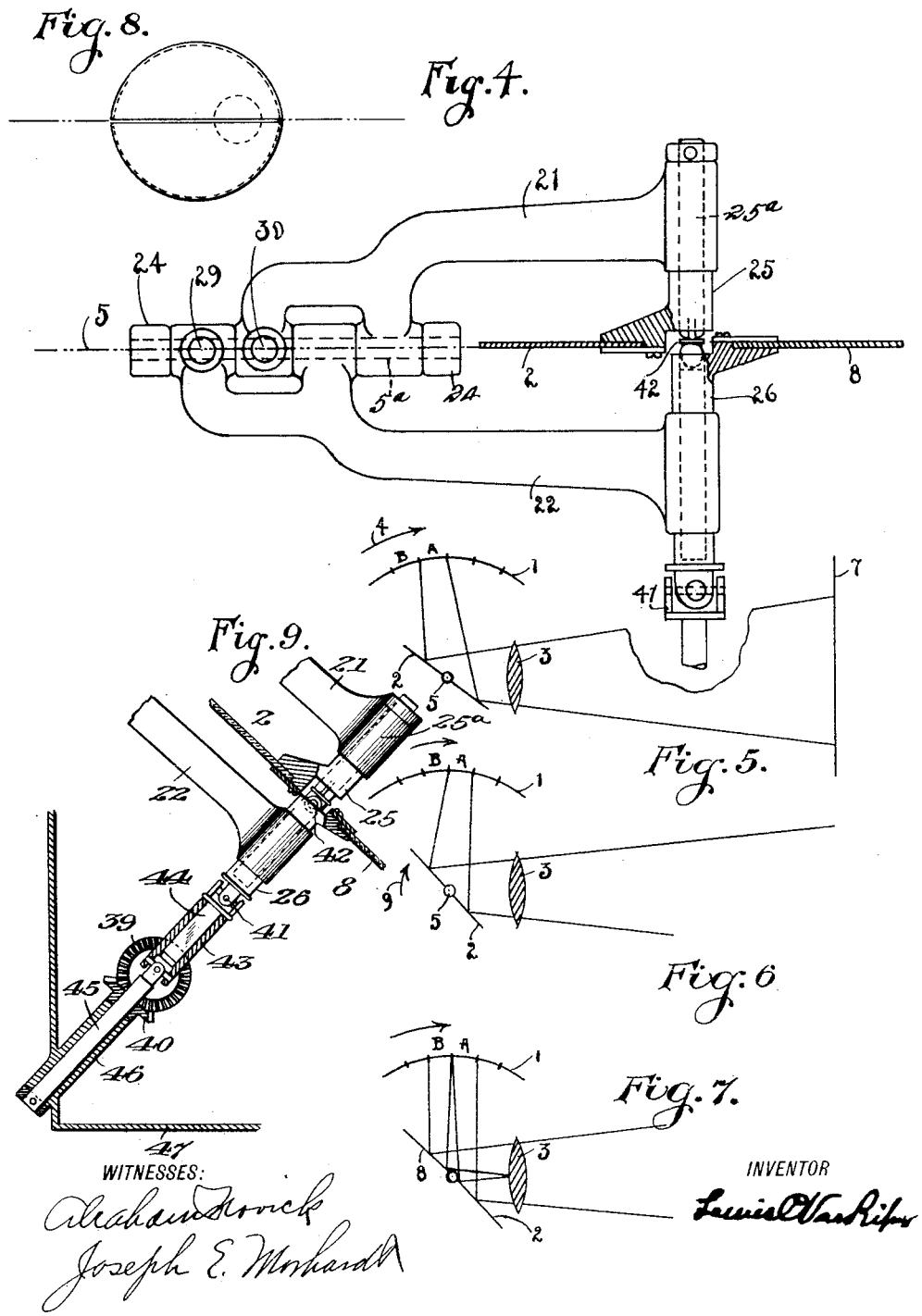

UNITED STATES PATENT OFFICE.

LEWIS C. VAN RIPER, OF NEW YORK, N. Y., ASSIGNOR TO VANOSCOPE COMPANY, A CORPORATION OF DELAWARE.

MOTION-PICTURE MACHINE.

1,085,392.  Specification of Letters Patent.  Patented Jan. 27, 1914.

Application filed July 19, 1911.  Serial No. 639,356.

*To all whom it may concern:*

Be it known that I, LEWIS C. VAN RIPER, of the borough of Manhattan, city, county, and State of New York, have invented certain new and useful Improvements in Motion-Picture Machines, of which the following is a specification.

My invention relates to a projecting machine for motion pictures of the type in which the film is given a continuous travel, instead of the usual intermittent travel, and a plurality of mirrors are provided which reflect the images from successive pictures and tilt as they pass through the rays of light from the film to compensate for the movement of the film so that the projections on the screen remain stationary and each successive image is dissolved into the preceding one.

One of the principal objects of the invention is to provide a simple, accurately operating mechanism for accomplishing the necessary movements of the mirrors.

Another object of my invention is to prevent vibration and dark intervals between successive pictures by keeping the volume of light constant and thus overcoming flicker.

A further object is to provide a mechanism in which the film travels over an arcuate path, the center of curvature of which lies in the axis on which the mirrors tilt so that as the distance of any given point on the film, while passing through the beam of light, to the rocking axis of the mirrors always remains the same, the image is not distorted and a constant focus is maintained with respect to the lens and screen.

The invention has for further objects to provide such other new and improved constructions, devices and arrangements in projecting apparatus for moving pictures as will be hereinafter described and claimed.

The invention is illustrated, in a preferred embodiment, in the accompanying drawings, in which—

Figure 1 is a side elevation of a projecting machine; Fig. 2, a fragmentary view of the mirrors and the apparatus for operating the same taken from a plane parallel to the mirrors; Fig. 3, a detail view of a part of the mechanism for rocking the mirrors; Fig. 4, a view of the parts shown in Fig. 2 looking edgewise at the mirrors which are in section; Figs. 5, 6, 7 and 8, diagrams illustrating the operation of the mirrors, and Fig. 9, an elevation, with parts in section, of a portion of the mechanism for rotating the mirrors.

Like characters of reference designate like parts in the several figures of the drawings.

Referring to the drawings, 17 indicates the source of light, 18, 19 the condensers, 20 a stationary mirror, and 3, 3, the projecting lenses.

The film is continuously driven in the direction indicated by the arrows 11 by the sprockets 12 rotated by the crank handle 13 through the interposition of gears 14, 15 and 16. In passing through the beam of light the film takes a curved path as shown in Figs. 1, 5, 6 and 7.

The images projected from the film are reflected through the lenses 3, 3, by the mirrors 2 and 8 and thence to screen 7 (Fig. 5). The mirror 2 is fixed to a shaft 25 having a reduced portion 25$^a$ revolubly mounted in a rocking bracket 21. The mirror 8 is similarly secured to a shaft 26 revolubly mounted in the rocking bracket 22, the brackets being mounted on a shaft 5$^a$ the axis of which is indicated by the broken line 5 which is fixed in the bracket 24. The brackets are rocked so as to give a forward tilt to their respective mirrors by the mutilated gears 27, 28, which mesh with sector gears 29, 30 on the rocking brackets 22 and 21, respectively, the mutilated gears being driven from gear 15 by gears 33, 33$^a$ and 34. The rocking brackets are returned to their initial position by means of cams 31 which operate against rollers 32$^a$ on the ends of rods 32, one of which is connected to each of the brackets. The cams are driven from crank 13 by gears 35 and 36.

The mirrors are rotated simultaneously by driving the shafts 25, 26 which are connected by a universal joint 42. Connected to the shaft 26 by a universal joint 41 is a flexible extensible shaft consisting of a sleeve 43 which is formed with a bore square in cross section, a square shaft 44 slidable in said bore and connected with the universal joint 41, a shaft 45 mounted in a bearing 46 in the casing 47 of the machine, and a universal joint connecting the sleeve 43 with shaft 45. The flexible shaft is driven from the crank 13 by gears 14, 37, 38 and miter gear 39 which meshes with miter gear 40 in the shaft element 45.

The operation of the machine above described will be best understood by reference to Figs. 5 to 8, inclusive. The mechanism is timed, let us suppose, so that as picture A on the film comes into the beam of light the image therefrom is reflected by mirror 2 which is inclined backwardly at its extreme limit. As the film moves forward, in the direction indicated by arrow 4, the mirror tilts toward the position shown in Fig. 6 at such an angular velocity that the projection on the screen remains stationary. At the same time both mirrors are rotating and as mirror 2 is about to leave the field mirror 8 is brought into position to reflect the image from picture B upon the same area of the screen occupied by the reflected projection from picture A. The position of the mirrors at this time is shown by Figs. 7 and 8, C indicating bundles of rays projected on the mirrors from pictures A and B. The adjacent edges of the mirrors at this moment are in parallelism since the axis 5 on which the mirrors tilt passes through the center of rotation of the mirrors so that at the time the edges of both mirrors are at right angles to the film no shadow is thrown as would be the case if the inner edges of the mirrors at this time stood at an angle to each other. It will be observed that by causing the film while passing through the beam of light to take a path which is the arc of a circle, the center of which is in the axis of tilting of the mirrors, each of the pictures being projected remains at a constant distance from the axis on which the mirrors tilt so that there is no distortion of the image or change in focal distance with respect to the lens, as would be the case if the path of the film were straight.

While I have described my invention in a preferred embodiment, it is realized that modifications in the constructions, devices and arrangements shown might be made without departure from the principles of the invention.

What I claim is:

1. An apparatus of the character described comprising means for guiding a picture film, means for continuously moving said film, a plurality of reflecting devices each mounted on a rotatable shaft connected together by a universal joint, means for rotating said shafts, and means for shifting the axial relation of the shafts to each other.

2. An apparatus of the character described comprising means for guiding a picture film over an arcuate path, means for continuously moving a picture film, a plurality of reflecting devices each mounted on a rotatable shaft, a flexible or universal joint connecting said shafts, means for rotating one of said shafts, and means for changing the axial relation of said shafts to each other.

3. In a projecting apparatus having means for continuously moving a picture film, means for guiding said film along an arcuate path through a beam of light, a plurality of reflectors to receive and reflect the picture rays, means for rotating said reflectors, and means for rocking said reflectors upon a common fixed axis at right angles to and intersecting the axis of rotation, to cause the image of one picture to dissolve into the next.

4. In a projecting apparatus the combination of a plurality of reflectors to receive and reflect the picture rays, means for rotating said reflectors, means for rocking said reflectors upon a fixed axis at right angles to the axis of rotation, means for continuously moving a picture film through a beam of light, means for guiding said film along an arcuate path substantially concentric with the rocking axis of said reflectors and synchronously with the rocking of said reflectors, to keep the distance between the film and the rocking axis of each reflector constant while moving through said beam of light.

5. In a projecting apparatus having means for continuously moving a picture film through a beam of light, a plurality of shafts connected together by a universal joint, a reflector attached to each of said shafts to receive and reflect the picture rays, means for rotating said shafts and reflectors, and means for supporting and moving said shafts in predetermined angular positions to each other synchronously with the movement of said film to rock said reflectors and compensate for the movement of said film.

6. In a projecting apparatus having means for continuously moving a picture film through a beam of light, a plurality of shafts connected together by a universal joint, a reflector attached to each of said shafts to receive and reflect the picture rays, means for rotating said shafts with their reflectors, and means for supporting and moving said shafts and reflectors in predetermined angular positions to each other and at right angles to the axis of rotation to compensate for the movement of said film.

7. In a projecting apparatus having means for guiding a picture film along an arcuate path through a beam of light, means for moving said film, two mirrors continuously rotatable together to receive and reflect the picture rays, each mirror mounted on a shaft supported by an independent bracket, both brackets mounted on a common supporting shaft the axis of which is at right angles to the axes of said first mentioned shafts, and means for rocking each of said brackets with its shaft and reflector independent of the other to compensate for the movement of said film.

8. In a projecting apparatus having means for continuously moving a picture film, means for guiding said film along an arcuate path through a beam of light, a plurality of rotating reflectors, and means for rocking said reflectors upon an axis which passes through the center of curvature of the path of said film.

9. In a projecting apparatus having means for continuously moving a picture film, means for guiding said film over an arc of a circle through a beam of light, a plurality of reflectors continuously rotatable together to receive and reflect the picture rays, means for rocking said reflectors upon a fixed axis to compensate for the movement of said film, said rocking axis being concentric with the path of the arc over which the film is moved.

10. In a projecting apparatus having means for continuously moving a picture film, means for guiding said film along and over an arcuate path through a beam of light, a plurality of reflectors to receive and reflect the picture rays, means for rotating said reflectors, and means for rocking said reflectors upon a common axis at right angles to and intersecting the axis of rotation, to cause the image of one picture to dissolve into the next.

11. In a projecting apparatus, the combination of a plurality of reflectors to receive and reflect the picture rays, means for rotating said reflectors and means for rocking said reflectors upon a common axis at right angles to the axis of rotation, means for continuously moving a picture film, means for guiding said film arcuately and concentric with the rocking axis of said reflectors to keep the distance from each portion of the film constant to the rocking axis of said reflectors while said film is moving through the beam of light.

12. In a projecting apparatus having means for continuously moving a picture film, means for guiding said film over an arched opening and through a beam of light, a plurality of reflectors to receive and reflect the picture rays, means for rotating said reflectors, and means for rocking said reflectors upon a common axis concentric with the radius of the curvature of said arched opening to keep the distance between the rocking axis of said reflectors and all portions of said film while passing through the beam of light constant to cause the image of one picture to fade into the next.

13. In a motion picture projecting machine, the combination with means for imparting a continuous travel to a film, of a plurality of mirrors supported upon shafts connected together by a universal joint, said shafts supported upon independent rocking arms, means for separately rocking said shafts, and means for rotating the mirrors simultaneously comprising a shaft connected to one of said mirrors and mechanism for rotating said shaft.

14. In a motion picture projecting machine, the combination with means for producing a beam of light, of means for giving a continuous travel to a motion picture film through the beam of light, a plurality of rotary tilting mirrors arranged to reflect the images projected from said film, means for rotating said mirrors, means for tilting said mirrors and means for guiding the portion of the film in the beam of light so that it has an arcuate path with its center in the axis of tilting of the mirrors.

15. In a motion picture projecting machine, the combination with means for producing a beam of light, of means for giving a continuous travel to a motion picture film through the beam of light, a plurality of rotary tilting mirrors having adjacently arranged edges, mechanism for rotating said mirrors, and mechanism for independently tilting said mirrors so timed that the said adjacent edges thereof are in parallelism when at a given point while passing through the beam of light to cause the image of one picture to fade into the next.

16. In a projecting apparatus, the combination of means for continuously moving a picture film, a plurality of reflecting devices mounted on rotatable shafts, said shafts connected together by a universal joint, means for rotating said shafts and means for shifting the axial relation of said shafts to each other.

17. In a projecting apparatus having means for continuously moving a picture film through a beam of light, a plurality of rotatable reflectors to receive and reflect the picture rays, means for rotating said reflectors and means for rocking said reflectors upon a common fixed axis at right angles to and intersecting the axis of rotation.

18. In a projecting apparatus having means for moving a picture film through a beam of light, means for guiding said film over an arcuate path through said beam of light, a plurality of reflectors adapted to interchangeably move through said light beam to receive and reflect the light rays, means for moving said reflectors and means for rocking each reflector to continuously change its angular position with respect to the film while moving through said beam of light.

19. In a projecting apparatus having means for continuously moving a picture film through a beam of light, means for guiding said film over an arcuate path through said light beam, a plurality of reflectors adapted to interchangeably move through said light beam to receive and reflect the light rays, means for moving said reflectors, and means for rocking each reflector upon a common fixed axis while moving through the beam of light to continuously change its angular position with respect to the film during the reflecting period.

20. In a projecting apparatus the combination of a lens, means for moving a picture film through a beam of light, means for guiding said film over an arcuate path through said beam of light, a plurality of reflectors adapted to interchangeably move through said light beam between said film and lens, to receive and reflect the light rays, means for moving said reflectors, and means for rocking each reflector to continuously change its angular position with respect to the film while moving through said beam of light.

LEWIS C. VAN RIPER.

Witnesses:
  JOSEPH E. MORHARDT,
  ABRAHAM NOVICK.

Copies of this patent may be obtained for five cents each, by addressing the "Commissioner of Patents, Washington, D. C."